US011427508B2

(12) United States Patent
Andresen et al.

(10) Patent No.: US 11,427,508 B2
(45) Date of Patent: Aug. 30, 2022

(54) PROCESS FOR PREPARING LOW AIR ENTRAINING, LOW VISCOSITY LIGNOSULFONATES

(71) Applicant: Borregaard AS, Sarpsborg (NO)

(72) Inventors: Martin Andresen, Sarpsborg (NO);
Guro Elise Fredheim, Sarpsborg (NO);
Jerry Gargulak, Rothschild, WI (US);
David L. Oldroyd, Toronto (CA);
Hans Petter Pettersen, Sarpsborg (NO); Anders Sjöde, Sarpsborg (NO);
Vibeke Bogetvedt Spernes, Sarpsborg (NO); Bjørn Arild Jensen, Sarpsborg (NO)

(73) Assignee: BORREGAARD AS, Sarpsborg (NO)

(*) Notice: Subject to any disclaimer, the term of this patent is extended or adjusted under 35 U.S.C. 154(b) by 743 days.

(21) Appl. No.: 16/092,741

(22) PCT Filed: Apr. 14, 2017

(86) PCT No.: PCT/IB2017/000571
§ 371 (c)(1),
(2) Date: Oct. 10, 2018

(87) PCT Pub. No.: WO2017/178894
PCT Pub. Date: Oct. 19, 2017

(65) Prior Publication Data
US 2019/0127275 A1    May 2, 2019

Related U.S. Application Data (60) Provisional application No. 62/323,372, filed on Apr. 15, 2016.

(51) Int. Cl.
C09J 11/06    (2006.01)
C04B 24/18    (2006.01)
(Continued)

(52) U.S. Cl.
CPC ............ C04B 24/18 (2013.01); C07G 1/00 (2013.01)

(58) Field of Classification Search
USPC .................. 106/400, 401, 499, 501.1
See application file for complete search history.

(56) References Cited

U.S. PATENT DOCUMENTS

| 2,935,473 A | 5/1960 | King et al. |
| 3,087,923 A | 4/1963 | King et al. |

(Continued)

FOREIGN PATENT DOCUMENTS

NL    7205474 A    10/1973

OTHER PUBLICATIONS

Brazilian National Institute for Industrial Property; Examination Report; Brazilian Application No. BR112018071132-2; dated May 24, 2021; 9 pages.

(Continued)

*Primary Examiner* — James E McDonough
(74) *Attorney, Agent, or Firm* — Foley & Lardner LLP (57) ABSTRACT

A method for preparing a low-air entraining, low viscosity lignosulfonate composition. The method comprises: a) applying heat to the crude lignosulfonate composition under suitable conditions to reduce sugar levels to below 10%, optionally below 5%, optionally below 3%), or optionally below 1%, on a dry basis; b) mixing a crude lignosulfonate composition with an effective amount of a source of trivalent ion to complex air entraining fatty acids and resin acids; c) lowering temperature to prevent viscosity buildup.

10 Claims, 6 Drawing Sheets

(51) Int. Cl.
  *C07G 1/00* (2011.01)
  *C04B 16/02* (2006.01)
  *C08K 5/00* (2006.01)
  *C04B 16/00* (2006.01)
  *C04B 14/00* (2006.01)

(56) References Cited

U.S. PATENT DOCUMENTS

| | | |
|---|---|---|
| 3,448,096 A | 6/1969 | Read |
| 3,505,243 A * | 4/1970 | Gray ................ C08H 6/00 |
| | | 106/725 |
| 4,019,995 A * | 4/1977 | Briggs ................ H01F 1/42 |
| | | 252/62.52 |
| 2004/0158033 A1 | 8/2004 | Benson et al. |
| 2008/0206126 A1 | 8/2008 | Benson et al. |

OTHER PUBLICATIONS

Chinese National Intellectual Property Administration (CNIPA); First Office Action; Chinese Application No. 201780034589.9; dated Dec. 18, 2020; 14 pages.
International Search Report and Written Opinion (ISA/EP) for International Application No. PCT/IB2017/000571, dated Aug. 29, 2017.
Decision of Rejection on CN 201780034589.9 dated Mar. 14, 2022, including partial English translation (8 pages).
Office Action on EP 17734135.1 dated Apr. 5, 2022 (5 pages).

* cited by examiner

PROCESS FOR PREPARING LOW AIR ENTRAINING, LOW VISCOSITY LIGNOSULFONATES

CROSS-REFERENCE TO RELATED APPLICATIONS

This application is a national stage entry under 35 U.S.C. § 371 of International Application No. PCT/IB/2017/000571, filed Apr. 14, 2017, which claims the benefit and priority under 35 U.S.C. § 119(e) of U.S. Provisional Application No. 62/322,372, filed Apr. 15, 2016, the contents of each of which are incorporated by reference into the present disclosure.

TECHNICAL FIELD

The present disclosure relates to a process for preparing lignosulfonates comprising low amounts of sugars as well as complexed resins with minimal viscosity increase. The present disclosure further relates to a process for preparing lignosulfonates with lower air entrainment and retardation in concrete formulations. Furthermore it relates to a process for preparing sodium lignosulfonates with improved properties from ammonium lignosulfonates.

BACKGROUND OF THE DISCLOSURE

Throughout this disclosure, various technical publications, patents and published patent specifications are referenced by an identifying citation. The disclosures of these publications, patents and published patent specifications are hereby incorporated by reference into the present disclosure to more fully describe the state of the art to which this disclosure pertains.

The following discussion of the background of the disclosure is merely provided to aid the reader in understanding the disclosure and is not admitted to describe or constitute prior art to the present disclosure.

Lignosulfonates are obtained from spent sulfite liquors in the sulfite pulping industry. Lignosulfonates can be obtained either from softwoods or hardwoods, as calcium, magnesium, sodium, or ammonium salts. Ammonium lignosulfonates may be ion exchanged to sodium or calcium salts, whereas calcium lignosulfonates may be converted to the ammonium or sodium form. Ramachandran, Vangipuram Seshachar, Concrete admixtures handbook: properties, science and technology, Cambridge University Press, 1996, provides general technological background that is relevant to the present disclosure.

Lignosulfonates are used as dispersants in a number of industries. These lignosulfonate products are often not acceptable for use in their crude form, that is immediately after evaporation of thin sulfite pulping liquor, and must be modified in order to provide the proper functionality for each individual industry and application. Industries, including oil well drilling, crop protection, plant nutrition, batteries, animal feed, mining, dyestuffs and concrete, all use lignosulfonates that have been modified from their original forms.

Possible performance deficiencies that would make a lignosulfonate unsuited for a particular industry include storage instability, application instability, lack of dispersion performance, and other secondary factors. Instability may occur during storage prior to customer use, such as a buildup of viscosity or microbial growth, or instability during use, such as evolution of ammonia gas. Secondary factors include performance attributes not directly related to the lignosulfonate molecule.

A large portion of the world's commercially utilized lignosulfonates is used as water reducing admixtures to increase the strength of concrete in various construction applications. When used in cement compositions, lignosulfonates reduce the amount of water required, and improve workability. Ammonium lignosulfonates are not sufficiently stable for the concrete industry. When used in concrete as a dispersant, ammonium lignosulfonates become unstable when used in a concrete mix, releasing free ammonia which is undesirable during concrete placement. Furthermore, ammonium lignosulfonates are notorious for their tendency to increase significantly in viscosity upon storage at elevated temperatures due to polycondensation reactions involving the ammonium ion.

Lignosulfonates, depending on the source and processing, may have several negative secondary effects that are manifested to varying degrees when applied as a concrete admixture. These include retarding the set of fresh concrete and increasing the amount of entrapped air present in concrete. The former is undesirable because delayed setting slows production rates, and the latter is undesirable because of decreased strength of the set concrete. These secondary effects are partially due to the lignosulfonate molecule, but primarily to other components in the spent liquor, such as monosaccharides, resins acids, and fatty acids.

Pine species are known to comprise considerable amounts of resin acids and/or fatty acids. When pine (e.g., loblolly pine) is used as a raw material in sulfite pulping, a certain amount of these lipophilic acids will migrate into the sulfite cooking liquor during the pulping process and thus end up in the resulting lignosulfonate product as more or less stable colloidal resin particles. Thus, lignosulfonates produced from pines usually tend to comprise higher levels of resin acids and fatty acids than lignosulfonates produced from, e.g., spruce.

When pine based lignosulfonates are used as water reducing additives in concrete mixtures, the resin and fatty acids are converted to highly surface active sodium soaps due to the alkaline conditions in the concrete. These soaps have a pronounced tendency to increase the quantity of entrained air in a concrete mixture. However, too high an amount of entrained air is undesirable as it severely reduces the compressive strength of the concrete. Accordingly, it is generally desirable to keep the level of resin acids and fatty acids in a lignosulfonate based water reducer at a minimum. For a pine based lignosulfonate water reducer that is high in resin acids and fatty acids, it would be advantageous to chemically complex the resin acids and fatty acids, and deactivate them.

Lignosulfonates obtained from acidic sulfite pulping processes may comprise significant amounts of monomeric sugars (hexose and pentose) originating from the hemicellulose in the wood raw material. It is well known that sugars will increase the set time of the concrete, which again may lead to poorer strength properties and delayed production rates.

Lignosulfonate products may be contaminated by bacteria (aerobic or anaerobic), fungus and yeast upon storage which leads to microbial growth and spoilage. Favourable conditions for microbial growth would be dilute solutions (≤40% dry substance), high sugar content, temperatures between 20 and 40° C. and pH-ranges close to 7.

Air entrainment and retardation encountered during lignosulfonate use in concrete compositions may be mitigated through formulation of the admixture. For example, accelerators are added to the admixture products to offset the retarding effect. The reagents commonly used as accelerators include the calcium salts of chloride, nitrate, nitrite, formate and thiocyanate. Inherently, however, these materials add cost to the admixture.

Another common formulation practice involves the use of defoamers. Various defoamer products have been used with some success to lower the entrapped air caused by lignosulfonates. Unfortunately, these defoamers have a negative impact on air entraining admixtures that are employed to improve the freeze-thaw durability of concrete. In addition, these materials add cost to the admixture. Therefore, addition of defoamers is not an accepted practice when freeze-thaw durability is required.

In the construction industry, various synthetic dispersants are employed that do not suffer from the above-listed drawbacks associated with lignosulfonates. Polynaphthalene sulfonate, melamine resin, and carboxylic polymers are, generally, the three classes of anionic dispersants used in this industry. These materials tend not to retard the set of concrete and result in only low quantities of entrapped air. However, they are derived from petroleum resources, and are much more costly than lignosulfonates. It would be desirable to have a cement dispersant without the negative side effects of set retardation and air entrainment, but derived from an environmentally benign, renewable, readily available, and relatively inexpensive source. Lignosulfonates have the potential to be such a dispersant, if it can be suitably modified to overcome its shortcomings in concrete admixtures.

In attempts to minimize the set-retarding and air-entraining effects of lignosulfonates, some modifications to lignosulfonate that have been employed in the past include: Alkali air oxidation (Japanese Kokai Sho-No. 55-56051); Polymerization of lignosulfonate to increase molecular weight (Japanese Kokoku Sho-No. 58-176158); and Co-polymerization of lignin and lignosulfonate with various vinylic monomers (U.S. Pat. No. 4,977,227).

Generally, these modifications do not deal with sugars, present in most acid sulfite spent liquors, which cause severe retardation. Moreover, they do not have a strong impact on reducing entrained air.

U.S. Patent Application Publication No. US 2008/0206126 A1, discloses a system used to remove ammonia and convert ammonium lignosulfonate to sodium lignosulfonate with the simultaneous addition of lime. The stated purpose of the addition of lime is to make a lignosulfonate compatible with certain admixtures, as well as precipitate sulfate salts which are later removed from the process stream by centrifugation. Lowering sulfate salts allows for the prevention of glauber's salt formation during storage and transport, as well as improved compatibility with calcium comprising concrete admixture formulations. However, the addition point for lime is not optimal and substantial lime, calcium sulfite and gypsum scale will form in the stripping column causing process interruptions to descale and clean the column.

U.S. Patent Application Publication No. US 2004/158033 A1, discloses a process for preparing lignosulfonate dispersants for concrete by treatment with trivalent metals. The stated purpose of this treatment is to lower the air entraining properties of the resulting lignosulfonate when used in concrete. A mechanism by which aluminum and iron ions lower air content in concrete is not provided. Neither exchange of the lignosulfonate counter ion nor reduction of sugar levels are disclosed.

SUMMARY OF THE DISCLOSURE

The present disclosure describes a process for preparing lignosulfonates with limited viscosity increase and a process for preparing lignosulfonates comprising low amounts of active resins and fatty acids as well as sugars.

The present disclosure further describes a process for preparing lignosulfonates with reduced air entrainment and set retardation when used in concrete.

Also provided is a method for producing a sodium lignosulfonate composition, wherein a crude ammonium lignosulfonate composition is treated with an effective amount of a strong base and steam.

To achieve the above noted improved properties, the disclosure provides a method for preparing a low viscosity lignosulfonate composition with reduced air entrainment and set retardation when used in concrete, the method comprising, alternatively consisting of, or yet further consisting essentially of a) applying heat to a crude lignosulfonate composition under suitable conditions to reduce sugar levels to below 10%, optionally below 5%, optionally below 3%, or optionally below 1%, on a dry basis, b) mixing the composition prepared by step a) with an effective amount of a source of trivalent ion to complex air entraining fatty acids and resin acids; and c) actively cooling the product of step b) to prevent viscosity build-up. In some embodiments, the crude lignosulfonate composition is heated to an internal temperature of about 101° C. or higher in step a).

In one embodiment, the crude lignosulfonate composition comprises ammonium lignosulfonate. In one embodiment, the method further comprises mixing the ammonium lignosulfonate with an effective amount of a strong base and steam to remove ammonia prior to step a).

In one embodiment, the active cooling can preferably be performed by lowering the temperature to 70° C. or below, preferably 60° C. or below, in less than two hours, preferably less than one hour, preferably using a heat exchanger.

In another aspect, provided herein is a low viscosity lignosulfonate composition with reduced air entrainment and set retardation when used in concrete obtainable by the methods disclosed herein.

In one aspect, provided herein is a method for preparing a low viscosity lignosulfonate composition with reduced air entrainment and set retardation when used in concrete, wherein the process comprises, alternatively consists of, or yet further consists essentially of a) mixing a crude lignosulfonate composition with an effective amount of a source of trivalent ion to complex air entraining fatty acids and resin acids; b) applying heat to the composition prepared by step a) under suitable conditions to reduce sugar levels to below 10%, optionally below 5%, optionally below 3%, or optionally below 1%, on a dry basis; and c) actively cooling the product of step b) to prevent viscosity build-up. In some embodiments, the crude lignosulfonate composition is heated to an internal temperature of about 101° C. or higher in step b).

In one aspect, provided herein is a method for preparing a low viscosity lignosulfonate composition with reduced air entrainment and set retardation when used in concrete, wherein the process comprises, alternatively consists of, or yet further consists essentially of: a) applying heat to a crude lignosulfonate composition under suitable conditions to reduce sugar levels to below 10%, optionally below 5%, optionally below 3%, or optionally below 1%, on a dry basis, and mixing the composition with an effective amount of a source of trivalent ion to complex air entraining fatty acids and resin acids; and b) cooling the product of step a)

to prevent viscosity build-up. In some embodiments, the crude lignosulfonate composition is heated to an internal temperature of about 101° C. or higher in step a).

In one embodiment, the crude lignosulfonate composition comprises ammonium lignosulfonate. In one embodiment, the method further comprises mixing the ammonium lignosulfonate with an effective amount of a strong base and steam to remove ammonia prior to step a).

In another aspect, provided herein is a method for preparing a low viscosity lignosulfonate composition with reduced air entrainment and set retardation when used in concrete, wherein the method comprises, alternatively consists of, or yet further consists essentially of: a) applying heat to a crude lignosulfonate composition under suitable conditions to reduce sugar levels to below 10%, optionally below 5%, optionally below 3%, or optionally below 1%, on a dry basis, and mixing the composition with an effective amount of a source of trivalent ion to complex air entraining fatty acids and resin acids; and b) optionally cooling the product of step a) to prevent viscosity build-up. In some embodiments, the crude lignosulfonate composition is heated to an internal temperature of about 101° C. or higher in step a).

In one embodiment, the crude lignosulfonate composition comprises ammonium lignosulfonate. In one embodiment, the method further comprises mixing the ammonium lignosulfonate with an effective amount of a strong base and steam to remove ammonia prior to step a).

In another aspect, provided herein is a method for preparing a storage stable lignosulfonate composition with reduced air entrainment and set retardation when used in concrete from a full sugar ammonium lignosulfonate composition, the method comprising, alternatively consisting of, or yet further consisting essentially of a) mixing a crude ammonium lignosulfonate solution with an effective amount of a strong base and steam to remove ammonia; b) applying heat to the crude lignosulfonate composition prepared by step a) to reduce sugar levels to below 10%, optionally below 5%, optionally below 3%, or optionally below 1%, on a dry basis; c) optionally mixing the lignosulfonate composition prepared by step b) with an effective amount of a source of trivalent ion to immobilize air entraining fatty acids and resin acids; and d) optionally cooling the product of step b) or c) to prevent viscosity build-up. In some embodiments, the crude lignosulfonate composition is heated to an internal temperature of about 101° C. or higher in step b).

In another aspect, provided herein is a method for preparing a storage stable lignosulfonate composition with reduced air entrainment and set retardation when used in concrete from a full sugar ammonium lignosulfonate composition, the method comprising, alternatively consisting of, or yet further consisting essentially of a) mixing a crude ammonium lignosulfonate solution with an effective amount of a source of trivalent ion to immobilize air entraining fatty acids and resin acids; b) mixing the product of step a) with an effective amount of a strong base and steam to remove ammonia; c) applying heat to the crude lignosulfonate composition prepared by step a) to reduce sugar levels to below 10%, optionally below 5%, optionally below 3%, or optionally below 1%, on a dry basis; and d) optionally cooling the product of step c) to prevent viscosity build-up. In some embodiments, the crude lignosulfonate composition is heated to an internal temperature of about 101° C. or higher in step c).

In a further embodiment of the above methods, the solution of lignosulfonate is treated with a combination of a trivalent ion (including but not limited to $Al^{3+}$ or $Fe^{3+}$) and heat such that the lignosulfonate solution is maintained at an internal temperature of about 60° C. to about 175° C. for about 0.5-24 hours. In some embodiments, the lignosulfonate solution is heated to an internal temperature of about 101° C. or higher, or alternatively about 102° C. or higher, or alternatively about 103° C. or higher, or alternatively about 104 ° C. or higher, or alternatively about 105° C. or higher, or alternatively about 110° C. or higher, or alternatively about 115° C. or higher, or alternatively about 120° C. or higher, or alternatively about 125° C. or higher, or alternatively about 130° C. or higher, or alternatively about 135° C. or higher, or alternatively about 140° C. or higher, or alternatively about 145° C. or higher, or alternatively about 150° C. or higher, or alternatively about 155° C. or higher, or alternatively about 160° C. or higher, or alternatively about 165° C. or higher, or alternatively about 170° C. or higher for about 0.5-24 hours. This results in a complexing of potentially air entraining resins and fatty acids, and a reduction of sugar levels below 10 wt %, optionally below 5 wt %, optionally below 3 wt %, or optionally below 1 wt % (on a dry basis).

The low viscosity lignosulfonate composition prepared by the processes disclosed herein provide multiple advantages, such as stability to storage and lower susceptibility to microbial attack due to lower sugar content, high dry matter, at a manageable viscosity, low water activity, and pH values of below 6.0, preferably below 5.0. Due to these improved properties, the low viscosity lignosulfonate compositions prepared by the processes disclosed herein are significantly improved than what currently exists in the industry and are also storage stable.

In another aspect, provided herein is a method for preparing a storage stable lignosulfonate composition with low air entrainment and set retardation when used in concrete, the method comprising, a) mixing a crude ammonium lignosulfonate solution with an effective amount of a strong base and steam to remove ammonia; and b) mixing the crude ammonium lignosulfonate solution or the lignosulfonate composition prepared by step a) with an effective amount of a source of trivalent ion to immobilize air entraining fatty acids and resin acids; c) optionally applying heat under suitable conditions to the crude lignosulfonate composition prepared by step b) to reduce sugar levels to below 10%, optionally below 5%, optionally below 3%, or optionally below 1%, on a dry basis; and d) optionally cooling the product of step c) to prevent viscosity build-up. In some embodiments, the crude lignosulfonate composition is heated to an internal temperature of about 101° C. or higher in step c).

In some embodiments of any of the above methods, the process is best carried out in a closed pressure vessel in order to heat the crude lignosulfonate composition to an internal temperature of 101° C. or higher in an aqueous system such as that described herein. The closed pressure vessel is properly equipped for such a process, and may include in particular a pressure relief system for safety and a stirring impeller. The system may be heated in any number of ways including circulation through a heat exchanger that is heated by live steam or other high boiling liquid at a controlled elevated temperature, or alternatively with live steam directly into the reactor. Pressure is required only to the point to which the system must be contained to achieve the desired temperature. In certain embodiments, pressure may be measured as PSIg, or pounds per square inch at gauge. Gauge pressure is measured relative to ambient atmospheric pressure. The source of measurement can either be a mechanical gauge, or an electronic transmitter.

In another aspect, provided herein is a storage stable lignosulfonate composition with reduced air entrainment and set retardation when used in concrete obtainable by the methods disclosed herein.

DETAILED DESCRIPTION

Before the methods and composition are described, it is to be understood that the present disclosure is not limited to the particular methodologies, protocols, and reagents described, as they may vary. It is also to be understood that the terminology used herein is intended to describe particular embodiments of the present disclosure, and is in no way intended to limit the scope of the present disclosure as set forth in the appended claims.

All numerical designations, e.g., pH, temperature, time, concentration, and molecular weight, including ranges, are approximations which are varied (+) or (−) by increments of 0.1. It is to be understood, although not always explicitly stated that all numerical designations are preceded by the term "about". It also is to be understood, although not always explicitly stated, that the reagents described herein are merely exemplary and that equivalents of such are known in the art.

As used in the specification and claims, the singular form "a", "an" and "the" include plural references unless the context clearly dictates otherwise.

As used herein, the term "admixing" intends the act of mixing, blending, or mingling together two or more substances.

"An effective amount" intends a quantity sufficient to achieve a desired or beneficial effect.

The term "solution" intends a homogenous liquid mixture of two or more substances.

As used herein, the term "source of heat" intends a method of heating the lignosulfonate solution to a specified internal temperature, e.g., of 60° C. to about 175° C. In some embodiments, the lignosulfonate solution is heated to an internal temperature of about 60° C., or alternatively about 70° C., or alternatively about 80° C., or alternatively about 90° C., or alternatively about 100° C., or alternatively about 110° C., or alternatively about 120° C., or alternatively about 130° C., or alternatively about 140° C., or alternatively about 150° C., or alternatively about 160° C., or alternatively about 170° C., or alternatively about 175° C. In some embodiments, the lignosulfonate solution is heated to an internal temperature of about 101° C. or higher, or alternatively about 102° C. or higher, or alternatively about 103° C. or higher, or alternatively about 104° C. or higher, or alternatively about 105° C. or higher, or alternatively about 110° C. or higher, or alternatively about 115° C. or higher, or alternatively about 120° C. or higher, or alternatively about 125° C. or higher, or alternatively about 130° C. or higher, or alternatively about 135° C. or higher, or alternatively about 140° C. or higher, or alternatively about 145° C. or higher, or alternatively about 150° C. or higher, or alternatively about 155° C. or higher, or alternatively about 160° C. or higher, or alternatively about 165° C. or higher, or alternatively about 170° C. or higher. In some embodiments, the lignosulfonate solution is heated to an internal temperature of greater than 100° C. to about 175° C. Examples include but are not limited to steam, electricity and heat exchangers.

As used herein, the term "caustic" or "strong base" intends sodium hydroxide, potassium hydroxide, calcium hydroxide, aluminum hydroxide, or magnesium hydroxide, an equivalent of each thereof, or any combination of these, preferably sodium hydroxide or potassium hydroxide.

As used herein, the term "source of steam" intends a method of applying steam to the lignosulfonate solution. In one embodiment, steam is injected into the lignosulfonate solution. Examples of a source of steam include but are not limited to gas boilers, biomass boilers, recovery boilers, liquid fuel boilers and electrical heating.

As used herein, the term "comprising" is intended to mean that the compositions and methods include the recited elements, but do not exclude others. "Consisting essentially of" when used to define compositions and methods, shall mean excluding other elements of any essential significance to the combination when used for the intended purpose. Thus, a composition consisting essentially of the elements as defined herein would not exclude trace contaminants or inert carriers. "Consisting of" shall mean excluding more than trace elements of other ingredients and substantial method steps. Embodiments defined by each of these transition terms are within the scope of this disclosure.

As used herein, the term "lignosulfonate" refers to a by-product of sulfite pulping. Lignosulfonates are obtained from spent sulfite liquors. They can be obtained from softwoods or hardwoods as calcium, magnesium, sodium, or ammonium salts. An ammonium lignosulfonate refers to a lignosulfonate having predominantly ammonium as the counter ion. Ammonium lignosulfonates may be ion exchanged to sodium or calcium salts, whereas calcium lignosulfonates may be converted to the ammonium or sodium form.

As used herein, the term "crude lignosulfonate" intends an unprocessed lignosulfonate, i.e. a concentrated spent sulfite liquor.

As used herein, the term "trivalent ion" refers to a cation with an oxidation state of +3. Examples include but are not limited to aluminum ($Al^{3+}$) and iron ($Fe^{3+}$).

As used herein, a low viscosity lignosulfonate intends below 2000 cps at 45% dry matter at 20° C., preferably below 1000 cps.

Methods of Preparing Low-Air Entraining, Low Viscosity Lignosulfonate Compositions In one aspect provided is a method for preparing a low viscosity lignosulfonate composition with reduced air entrainment and set retardation when used in concrete, the method comprising of, or alternatively consists essentially of, or yet further consists of the steps a) applying heat to a crude lignosulfonate composition under suitable conditions to reduce sugar levels to below 10%, optionally below 5%, optionally below 3%, or optionally below 1%, on a dry basis; and b) mixing the composition prepared by step a) with an effective amount of a source of trivalent ion to complex air entraining fatty acids and resin acids; and c) lowering the temperature of the product of step b) to prevent viscosity build-up, thereby preparing the low viscosity lignosulfonate composition with reduced air entrainment and set retardation when used in concrete. In some embodiments, the crude lignosulfonate composition is heated to an internal temperature of about 101° C. or higher in step a).

In one aspect, provided herein is a method for preparing a low viscosity lignosulfonate composition with reduced air entrainment and set retardation when used in concrete, wherein the process comprises, alternatively consists of, or yet further consists essentially of a) mixing a crude lignosulfonate composition with an effective amount of a source of trivalent ion to complex air entraining fatty acids and resin acids; b) applying heat to the composition prepared by step a); and c) actively cooling the product of step b) to prevent viscosity build-up. In some embodiments, the crude lignosulfonate composition is heated to an internal temperature of about 101° C. or higher in step b).

In one aspect, provided herein is a method for preparing a low viscosity lignosulfonate composition with reduced air entrainment and set retardation when used in concrete, wherein the process comprises, alternatively consists of, or yet further consists essentially of: a) applying heat to a crude lignosulfonate composition under suitable conditions to reduce sugar levels to below 10%, optionally below 5%, optionally below 3%, or optionally below 1%, on a dry basis, and mixing the composition with an effective amount of a source of trivalent ion to complex air entraining fatty acids and resin acids; and b) cooling the product of step a) to prevent viscosity build-up. In some embodiments, the crude lignosulfonate composition is heated to an internal temperature of about 101° C. or higher in step a).

In one embodiment, the disclosure describes treating a solution of lignosulfonate with a combination of a trivalent ion (including but not limited to $Al^{3+}$ or $Fe^{3+}$) and heat such that the lignosulfonate solution is maintained at an internal temperature of about 60° C. to about 175° C. for about 0.5-24 hours. In some embodiments, the lignosulfonate solution is heated to an internal temperature of about 101° C. or higher, or alternatively about 102° C. or higher, or alternatively about 103° C. or higher, or alternatively about 104° C. or higher, or alternatively about 105° C. or higher, or alternatively about 110° C. or higher, or alternatively about 115° C. or higher, or alternatively about 120° C. or higher, or alternatively about 125° C. or higher, or alternatively about 130° C. or higher, or alternatively about 135° C. or higher, or alternatively about 140° C. or higher, or alternatively about 145° C. or higher, or alternatively about 150° C. or higher, or alternatively about 155° C. or higher, or alternatively about 160° C. or higher, or alternatively about 165° C. or higher, or alternatively about 170° C. or higher for about 0.5-24 hours. In some embodiments, the lignosulfonate solution is heated to an internal temperature of greater than 100° C. to about 175° C. for about 0.5-24 hours. This results in a complexing of potentially air entraining resins and fatty acids, and a reduction of sugar levels below 10 wt %, optionally below 5 wt %, optionally below 3 wt %, or optionally below 1 wt % (on a dry basis).

In another aspect, provided herein is a method for preparing a low viscosity lignosulfonate composition with reduced air entrainment and set retardation when used in concrete, wherein the method comprises, alternatively consists of, or yet further consists essentially of: a) applying heat to a crude lignosulfonate composition under suitable conditions to reduce sugar levels to below 10%, optionally below 5%, optionally below 3%, or optionally below 1%, on a dry basis, and mixing the composition with an effective amount of a source of trivalent ion to complex air entraining fatty acids and resin acids; and b) optionally cooling the product of step a) to prevent viscosity build-up. In some embodiments, the crude lignosulfonate composition is heated to an internal temperature of about 101° C. or higher in step a).

In one embodiment, the crude lignosulfonate composition comprises ammonium lignosulfonate. In one embodiment, the method further comprises mixing the ammonium lignosulfonate with an effective amount of a strong base and steam to remove ammonia prior to step a).

Another embodiment is a method wherein the crude lignosulfonate composition comprises, or alternatively consists essentially of, or yet further consists of ammonium lignosulfonate, typically with a dry matter content of 30-70%, and the method further comprises, or alternatively consists essentially of, or yet further consists of mixing the ammonium lignosulfonate with an effective amount of strong base (e.g. sodium hydroxide), and steam to remove ammonia. Ammonia is removed by adding strong base, which converts ammonium ions to soluble ammonia gas which is distilled by moving steam through the ammonia solution. This stripping process is done prior to mixing the crude lignosulfonate composition with a source of each of a trivalent ion and heat. An effective amount of caustic can be from about 5% to about 25% strong base based on lignosulfonate dry weight basis. In some embodiments, the strong base comprises sodium hydroxide.

To determine whether ammonia has been removed, the free ammonia in the lignosulfonate composition is measured and should be below 0.5% wt/wt on a dry basis at a pH above 10.

In a certain embodiment, the disclosure describes treating a solution of ammonium lignosulfonate with sodium hydroxide solution or another strong base and steam stripping said lignosulfonate to remove ammonia (ammonium ions are converted to soluble ammonia gas which is distilled off), followed by heat, then treatment with trivalent ion (e.g. $Al^{3+}$ or $Fe^{3+}$) and heat, then cooled to 60° C. or below to respectively complex potentially air entraining resins and fatty acids, reduce sugar levels, and prevent viscosity increase.

After the removal of ammonia, the pH of the sodium lignosulfonate is still relatively high. By applying heat as the following step, an effective sugar conversion is obtained without additional addition of base. Furthermore, by performing the heat treatment at an internal temperature above 101° C. or higher, the sugar conversion is significantly accelerated. In any of the above embodiments, the lignosulfonate solution is heated to an internal temperature of about 101° C. or higher, or alternatively about 102° C. or higher, or alternatively about 103° C. or higher, or alternatively about 104° C. or higher, or alternatively about 105° C. or higher, or alternatively about 110° C. or higher, or alternatively about 115° C. or higher, or alternatively about 120° C. or higher, or alternatively about 125° C. or higher, or alternatively about 130° C. or higher, or alternatively about 135° C. or higher, or alternatively about 140° C. or higher, or alternatively about 145° C. or higher, or alternatively about 150° C. or higher, or alternatively about 155° C. or higher, or alternatively about 160° C. or higher, or alternatively about 165° C. or higher, or alternatively about 170° C. or higher. In some embodiments, the lignosulfonate solution is heated to an internal temperature of greater than 101° C. to about 175° C. Thus, by combining these two steps, a cost and time effective process for preparing a lignosulfonate composition with improved performance in concrete is achieved.

By adding strong base, the ammonium ions are converted to soluble ammonia gas which is distilled by moving steam through the ammonia solution. To determine whether ammonia has been removed, the ammonia in the lignosulfonate composition is measured and should be below 0.5% wt/wt on a dry basis, as measured using an ion selective electrode.

Another aspect provided herein is a method of preparing a storage stable lignosulfonate composition with reduced air entrainment and set retardation when used in concrete, from a full sugar ammonium lignosulfonate composition, the method comprising, or alternatively consisting essentially of, or yet further consists of: a) mixing a crude ammonium lignosulfonate solution with an effective amount of a strong base and steam to remove ammonia; b) applying heat to the crude lignosulfonate composition prepared by step a) to reduce sugar levels to below 10%, optionally below 5%, optionally below 3%, or optionally below 1%, on a dry basis; and c) optionally mixing the lignosulfonate composition prepared by step b) with an effective amount of a source of trivalent ion to immobilize air entraining fatty acids and resin acids; and d) optionally cooling the product of step b) or c) to prevent viscosity build-up In some embodiments, the crude lignosulfonate composition is heated to an internal temperature of about 101° C. or higher in step b).

In another aspect, provided herein is a method for preparing a storage stable lignosulfonate composition with reduced air entrainment and set retardation when used in concrete from a full sugar ammonium lignosulfonate composition, the method comprising, alternatively consisting of, or yet further consisting essentially of a) mixing a crude ammonium lignosulfonate solution with an effective amount of a source of trivalent ion to immobilize air entraining fatty acids and resin acids; b) mixing the product of step a) with an effective amount of a strong base and steam to remove ammonia; c) applying heat to the crude lignosulfonate composition prepared by step a) to reduce sugar levels to below 10%, optionally below 5%, optionally below 3%, or optionally below 1%, on a dry basis; and d) optionally cooling the product of step c) to prevent viscosity build-up. In some embodiments, the crude lignosulfonate composition is heated to an internal temperature of about 101° C. or higher in step c).

In another aspect, provided herein is a method for preparing a storage stable lignosulfonate composition with low air entrainment and set retardation when used in concrete, the method comprising, a) mixing a crude ammonium lignosulfonate solution with an effective amount of a strong base and steam to remove ammonia; and b) mixing the crude ammonium lignosulfonate solution or the lignosulfonate composition prepared by step a) with an effective amount of a source of trivalent ion to immobilize air entraining fatty acids and resin acids; c) optionally applying heat under suitable conditions to the crude lignosulfonate composition prepared by step b) to reduce sugar levels to below 10%, optionally below 5%, optionally below 3%, or optionally below 1%, on a dry basis; and d) optionally cooling the product of step c) to prevent viscosity build-up In some embodiments, the crude lignosulfonate composition is heated to an internal temperature of about 101° C. or higher in step c).

Another aspect is a method wherein a crude ammonium lignosulfonate composition is treated with an effective amount of a strong base and steam. In some embodiments, the crude ammonium lignosulfonate composition typically has a dry matter content of 30-70%. In some embodiments, the strong base is sodium hydroxide, 5-25% on lignosulfonate dry basis, optionally 10-15%. Treating the crude ammonium lignosulfonate composition with an effective amount of strong base and steam converts ammonium ions to soluble ammonia gas which is distilled by moving steam through the ammonia solution and produces a sodium lignosulfonate composition.

In some embodiments of any of the above methods, the process is best carried out in a closed pressure vessel in order to heat the crude lignosulfonate composition to an internal temperature of about 101° C. or higher in an aqueous system such as that described herein. The closed pressure vessel is properly equipped for such a process, and may include in particular a pressure relief system for safety and a stirring impeller. The system may be heated in any number of ways including circulation through a heat exchanger that is heated by live steam or other high boiling liquid at a controlled elevated temperature, or alternatively with live steam directly into the reactor. Pressure is required only to the point to which the system must be contained to achieve the desired temperature. In certain embodiments, pressure may be measured as PSIg, or pounds per square inch at gauge. Gauge pressure is measured relative to ambient atmospheric pressure. The source of measurement can either be a mechanical gauge, or an electronic transmitter.

In each of the above aspects, the trivalent ion is preferably an iron ($Fe^{3+}$) or aluminum ($Al^{3+}$) ion. The trivalent ion can be added at any stage after ammonia stripping and in the form of a variety of Fe or Al salts, including aluminum sulfate ($Al_2(SO_4)_3$), aluminum nitrate ($Al(NO_3)_3$), aluminum chloride ($AlCl_3$), iron sulfate ($Fe_2(SO_4)_3$) and iron chloride ($FeCl_3$). Aluminum sulfate (Alum) is widely used as a paper sizing additive in the pulp and paper industry, and is, due to its availability, the preferred salt for this process.

In one embodiment of the above noted methods, the solution of lignosulfonate is treated with a combination of a trivalent ion (including but not limited to $Al^{3+}$ or $Fe^{3+}$) and heat such that the lignosulfonate solution is maintained at an internal temperature of about 60° C. to about 175° C. for about 0.5-24 hours. In some embodiments, the lignosulfonate solution is heated to an internal temperature of about 101° C. or higher, or alternatively about 102° C. or higher, or alternatively about 103° C. or higher, or alternatively about 104° C. or higher, or alternatively about 105° C. or higher, or alternatively about 110° C. or higher, or alternatively about 115° C. or higher, or alternatively about 120° C. or higher, or alternatively about 125° C. or higher, or alternatively about 130° C. or higher, or alternatively about 135° C. or higher, or alternatively about 140° C. or higher, or alternatively about 145° C. or higher, or alternatively about 150° C. or higher, or alternatively about 155° C. or higher, or alternatively about 160° C. or higher, or alternatively about 165° C. or higher, or alternatively about 170° C. or higher for about 0.5-24 hours. In some embodiments, the lignosulfonate solution is heated to an internal temperature of greater than 100° C. to about 175° C. for about 0.5-24 hours. This results in a complexing of potentially air entraining resins and fatty acids, and a reduction of sugar levels below 10 wt %, optionally below 5 wt %, optionally below 3 wt %, or optionally below 1 wt % (on a dry basis).

Without wishing to be bound by this theory, Applicant believes that the trivalent ions deactivate soaps and resins from the lignosulfonate by lowering the solubility, or perhaps flocculation, of the resins and fatty acids in the lignosulfonate solution so that they are not available in their soap form. In addition, these Al and Fe resinates may act as a defoamer which counteracts any air bubble stabilization in concrete that may be created by any species in the processed lignosulfonate liquor.

The amount of added trivalent ions (e.g., $Al^{3+}$ and/or $Fe^{3+}$) will be in the range of about 0.001 to about 3 moles/kilogram crude lignosulfonate, or alternatively from about 0.005 to about 0.6 moles/kilogram, or yet further from about 0.01 to about 0.4 moles/kilogram, on a dry basis. In one embodiment, the effective amount of trivalent ion comprises, or alternatively consists essentially of, or yet further consists of from about 0.001 to about 3 moles/kilogram of crude lignosulfonate, on a dry basis. In another embodiment, the effective amount of trivalent ion comprises, or alternatively consists essentially of, or yet further consists of from about 0.005 to 0.6 moles/kilogram of crude lignosulfonate. In a further embodiment, the effective amount of trivalent ion comprises, or alternatively consists essentially of, or yet further consists of from about 0.01 to 0.4 moles/kilogram of crude lignosulfonate. In some embodiments, the effective amount of trivalent ion comprises 0.01, or alternatively 0.03 or alternatively, 0.05 or alternatively 0.07 or alternatively, 0.09 or alternatively, 0.1 or alternatively, 0.13 or alternatively, 0.15 or alternatively, 0.17 or alternatively, 0.19 or alternatively, or alternatively 0.2, or alternatively 0.3, or alternatively 0.4 moles/kilogram of crude lignosulfonate.

Trivalent ions like Al and Fe are known to form insoluble coordination complexes (Al or Fe resinates) with the carboxylic group of resin acids and fatty acids, thereby removing or reducing their capacity to form surface active soaps under alkaline conditions. It has been found that as a result, a pine based lignosulfonate treated with Alum as described above, will comprise lower levels of free saponifiable resin acids and fatty acids and entrain less air when used as a water reducing agent in concrete.

In certain embodiments, the source of the trivalent ion is selected from aluminum sulfate, aluminum nitrate, aluminum chloride, iron sulfate, and/or iron chloride. In some embodiments, the source of the trivalent ion can be added prior or after heat treatment. In some embodiments, the source of the trivalent ion can be added prior or after ammonia removal.

In order to reduce the sugar content of the lignosulfonate, the process described herein is carried out at a temperature in the range of 60° C. to 175° C. at an alkaline pH, typically in a pH range of about 7 to about 14, or alternatively in a pH range of 8 to 13. In some embodiments, the process described herein is carried out at an alkaline pH of about 7, or alternatively 8, or alternatively 9, or alternatively 10, or alternatively 11, or alternatively 12, or alternatively 13 or alternatively 14. In one embodiment, the solution is heated to an internal temperature of from about 60° C. to about 175° C. or about 80° C. to about 175° C. In some embodiments, the solution is heated to an internal temperature of about 60° C., or alternatively 70° C., or alternatively 80° C., or alternatively 90° C., or alternatively 100° C., or alternatively 110° C., or alternatively 120° C., or alternatively 130° C., or alternatively 140° C., or alternatively 150° C., or alternatively 160° C., or alternatively 170° C., or alternatively 175° C. In some embodiments, the lignosulfonate solution is heated to an internal temperature of about 101° C. or higher, or alternatively about 102° C. or higher, or alternatively about 103° C. or higher, or alternatively about 104° C. or higher, or alternatively about 105° C. or higher, or alternatively about 110° C. or higher, or alternatively about 115° C. or higher, or alternatively about 120° C. or higher, or alternatively about 125° C. or higher, or alternatively about 130° C. or higher, or alternatively about 135° C. or higher, or alternatively about 140° C. or higher, or alternatively about 145° C. or higher, or alternatively about 150° C. or higher, or alternatively about 155° C. or higher, or alternatively about 160° C. or higher, or alternatively about 165° C. or higher, or alternatively about 170° C. or higher. In some embodiments, the lignosulfonate solution is heated to an internal temperature of greater than 100° C. to about 175° C.

In another embodiment, suitable conditions of the disclosed method comprise, or alternatively consist essentially of, or yet further consists of adjusting the initial pH of the process to a pH of about 7 to about 14, optionally about 8 to about 13.

In another embodiment, suitable conditions of the disclosed method comprise, or alternatively consist essentially of, or yet further consists of carrying out the reaction under atmospheric conditions at an initial pH of about 7 or above at an internal temperature at about 70-100° C. for about 1-10 hours, and/or under pressure at an internal temperature at about 100 -150° C. for 0.1-3 hours, to destroy sugars. In some embodiments, the reaction is carried out under pressure at an internal temperature greater than 100° to about 150° C. for 0.1-3 hours. In some embodiments, the reaction is carried out under pressure at an internal temperature about greater than about 101° C. or higher, or alternatively about 102° C. or higher, or alternatively about 103° C. or higher, or alternatively about 104° C. or higher, about 105° C., or alternatively about 110° C., or alternatively about 115° C., or alternatively about 120° C., or alternatively about 125° C., or alternatively about 130° C., or alternatively about 135° C., or alternatively about 140° C., or alternatively about 145° C. to about 150° C. for 0.1-3 hours, all indicating internal temperatures.

In one particular aspect, the method comprises, or alternatively consists essentially of, or yet further consists of a) direct use of caustic prior to column steam stripping of ammonia without the addition of lime per U.S. Patent Application Publication No. US 2008/0206126 A1; b) subsequent heating of the liquor ensuring a reduction in the amount of sugars, said sugars having a negative secondary effect on concrete set times; the reaction can be carried out under atmospheric conditions at an internal temperature about from 70-100° C. for 1-10 hours, or under pressure at 100° C. to about 150° C. for 15-60 minutes; c) addition of alum, or trivalent ion sulfate salts in conjunction with, or after heating to prevent reactor fouling; and d) cooling the reaction product to prevent viscosity buildup.

In some embodiments, the reaction is carried out under pressure at an internal temperature greater than 100° C. to about 150° C. for 15-60 minutes. In some embodiments, the reaction is carried out under pressure at an internal temperature greater than about 101° C., or alternatively about 102° C. or higher, or alternatively about 103° C. or higher, or alternatively about 104° C. or higher, or alternatively about 105° C., or alternatively about 110° C., or alternatively about 115° C., or alternatively about 120° C., or alternatively about 125° C., or alternatively about 130° C., or alternatively about 135° C., or alternatively about 140° C., or alternatively about 145° C. to about 150° C. for 0.1-3 hours.

Also provided herein are low viscosity lignosulfonates with reduced air entrainment and set retardation when used in concrete, obtainable by the methods disclosed herein.

Also provided herein are storage stable lignosulfonate compositions with reduced air entrainment and set retardation when used in concrete, obtainable by the methods disclosed herein.

EXAMPLES

Example 1

This example illustrates how the described process efficiently reduces the ammonia and sugar levels of lignosulfonates.

A 55% ammonium lignosulfonate solution was added 50% caustic at a ratio of 15% caustic to solids and steam stripped with live steam to remove ammonia. The resulting ion exchanged sodium lignosulfonate was treated with heat at 135° C. for 2 hours, followed by addition of 2% $Al_2(SO_4)_3$ and heat treatment at 95° C. for another 2 hours. The sugar level (measured as reducing sugars after reaction with p-Hydrobenzoic Acid Hydracide and detection on a Flow Injection Analyzer) and ammonia content (measured using an ion selective electrode) of the untreated ammonium lignosulfonate and the sodium lignosulfonate obtained from the treatment were measured and the results are summarized in Table 1.

TABLE 1

| Sample | Reducing sugars, wt % on DM | $NH_3$, wt % on DM |
|---|---|---|
| Before treatment | 18 | 3 |
| After treatment | 5.8 | <0.1 |

Example 2

This example shows the effect of the described treatment on the performance of lignosulfonate as a water reducer in concrete. The sodium lignosulfonate sample obtained from the treatment described in Example 1 was evaluated together with the untreated ammonium lignosulfonate in concrete at 0.2% and 0.4% sbwc dosage. The cement used was a Holcim USA (307 kg/m³ cement, w/c 0.7). The results are summarized in FIGS. 2-6.

Example 3

This example serves to further illustrate the effect of the described treatment on the performance of lignosulfonate as a water reducer in concrete, with emphasis on the effect of the dosage level of Al-ions on the air entraining properties. The cement used was a Holcim USA (307 kg/m³ cement, w/c 0.7).

The treatment consisted of adding 50% caustic to a 55% ammonium lignosulfonate solution at a ratio of 15% caustic to solids, followed by steam stripping with live steam to remove ammonia. The resulting ion exchanged sodium lignosulfonate was treated with heat at 135° C. for 2 hours, before the sample was split in two. The two resulting samples were added 1% and 3% $Al_2(SO_4)_3$, respectively, and heat reacted at 95° C. for 2 hours. The sugar level (measured as reducing sugars after reaction with p-Hydrobenzoic Acid Hydracide and detection on a Flow Injection Analyzer) and ammonia content (measured using an ion selective electrode) of the untreated ammonium lignosulfonate and the two sodium lignosulfonate samples obtained from the treatment were measured and the results are summarized in Table 2.

TABLE 2

| Sample | Reducing sugars, wt % on DM | $NH_3$, wt % on DM |
|---|---|---|
| Untreated | 18 | 3 |
| Treated, 1% Alum | 6.3 | <0.1 |
| Treated, 3% Alum | 5.4 | <0.1 |

Figure 1:
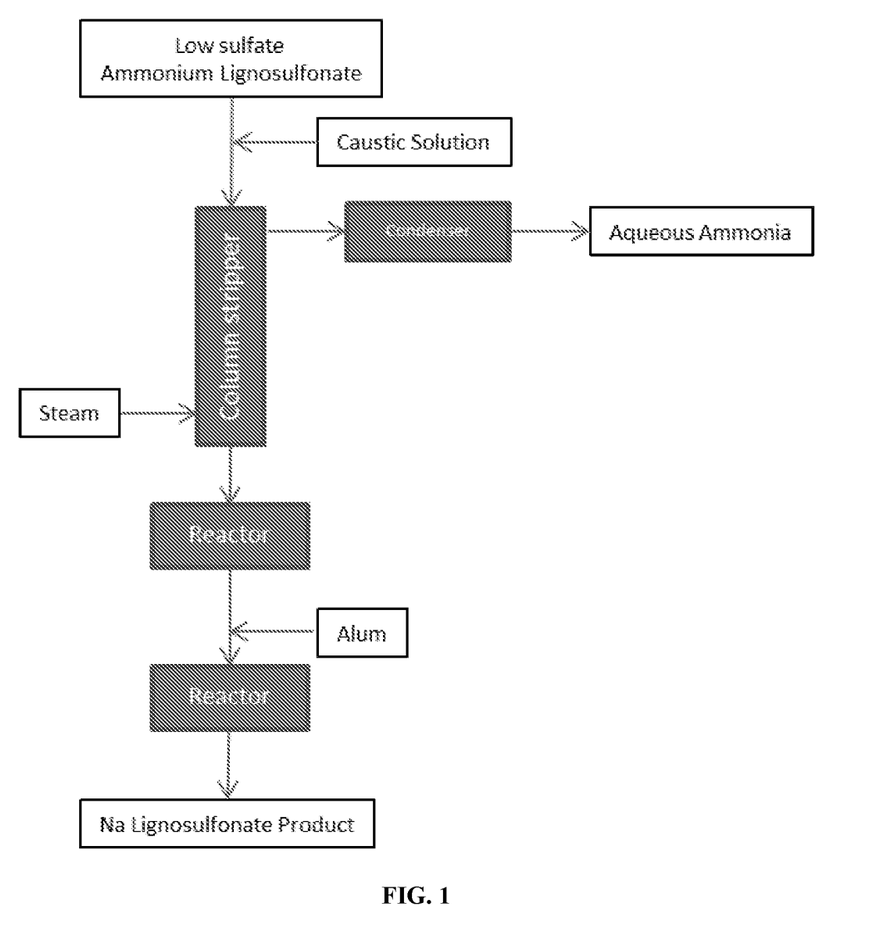
FIG. 1 is a schematic presentation of the process of treating a low-sulfate crude ammonium lignosulfonate solution with caustic, followed by steam stripping to drive off ammonia. The lignosulfonate solution is then immediately treated with heat to reduce sugars, prior to addition of trivalent ion and a second heat treatment to complex air entraining resin and fatty acids.
Figure 2:
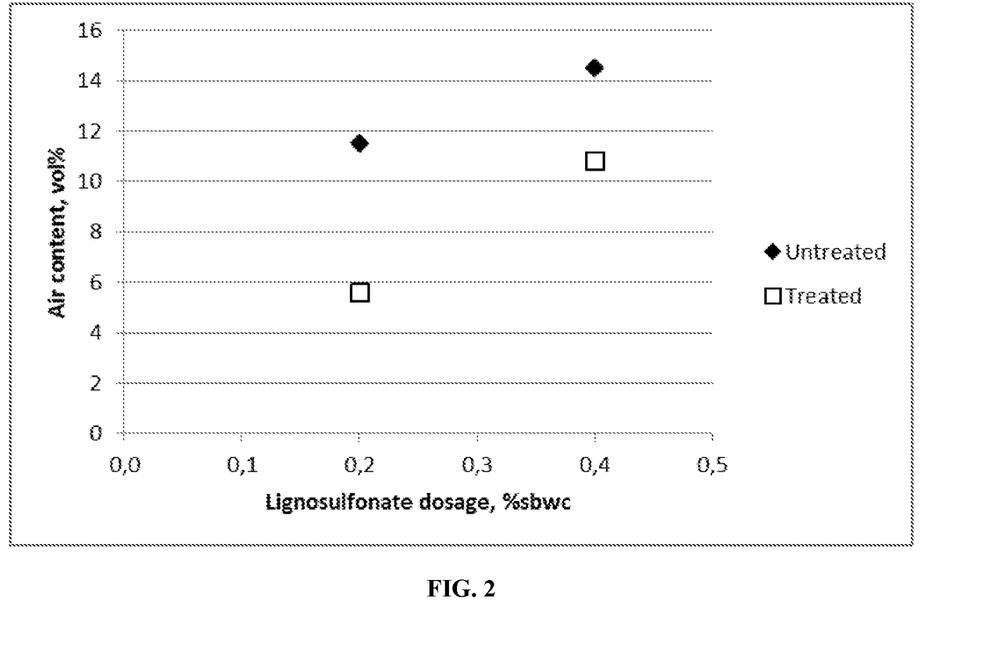
FIG. 2 compares the air entraining properties of a treated and an untreated lignosulfonate sample. The treated lignosulfonate sample shows significantly reduced air entraining properties at both dosages compared to the untreated reference ammonium lignosulfonate.
Figure 3:
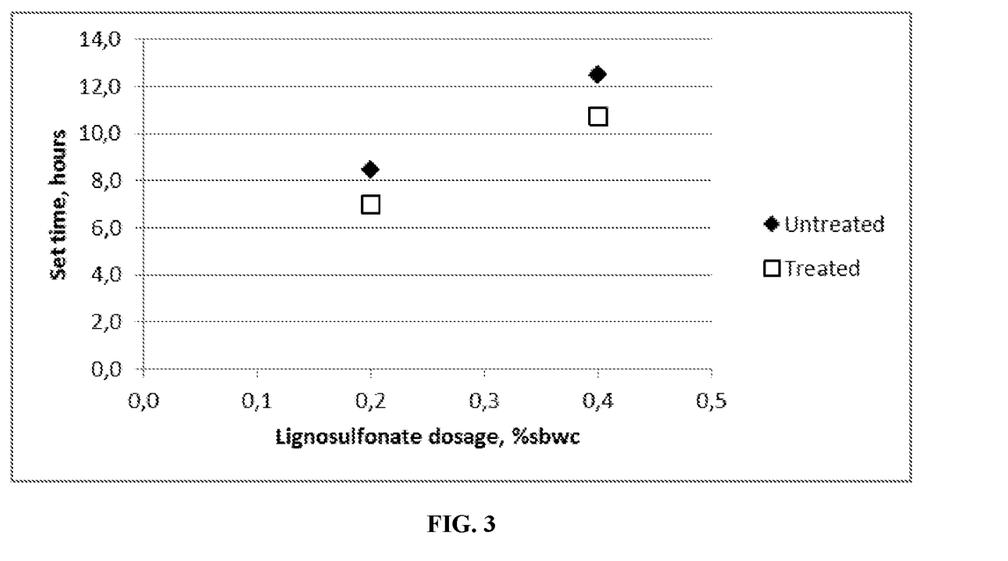
FIG. 3 compares the set times for a treated and an untreated lignosulfonate sample. Due to its lower sugar content, the treated lignosulfonate sample gives lower set times at both dosages when compared to the untreated reference ammonium lignosulfonate.
Figure 4:
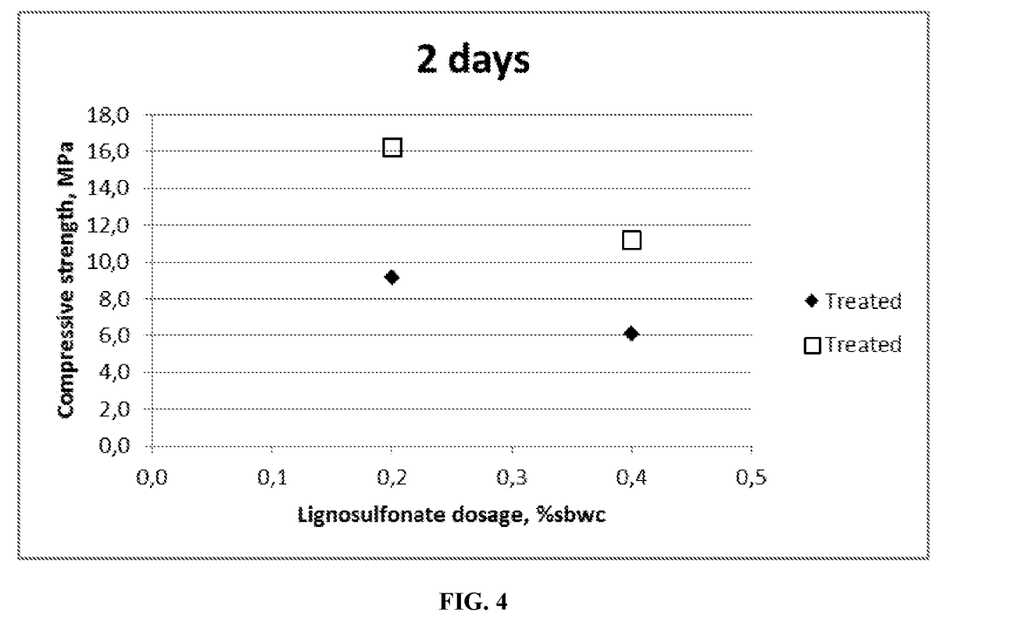
FIGS. 4-6 compare the compressive strength of a non-treated and a treated lignosulfonate sample after 2 days, 7 days and 28 days. The lower air content and lower set times for the concrete comprising the treated lignosulfonate sample is reflected in significantly higher compressive strength after 2, 7 and 28 days, for both dosages.
Figure 5:
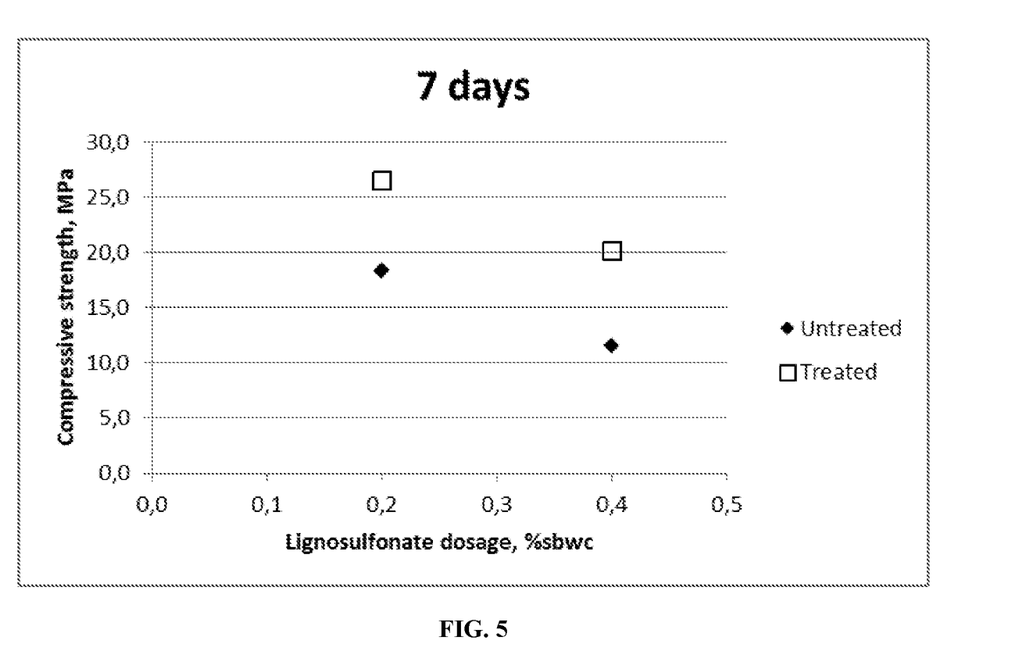
Figure 6:
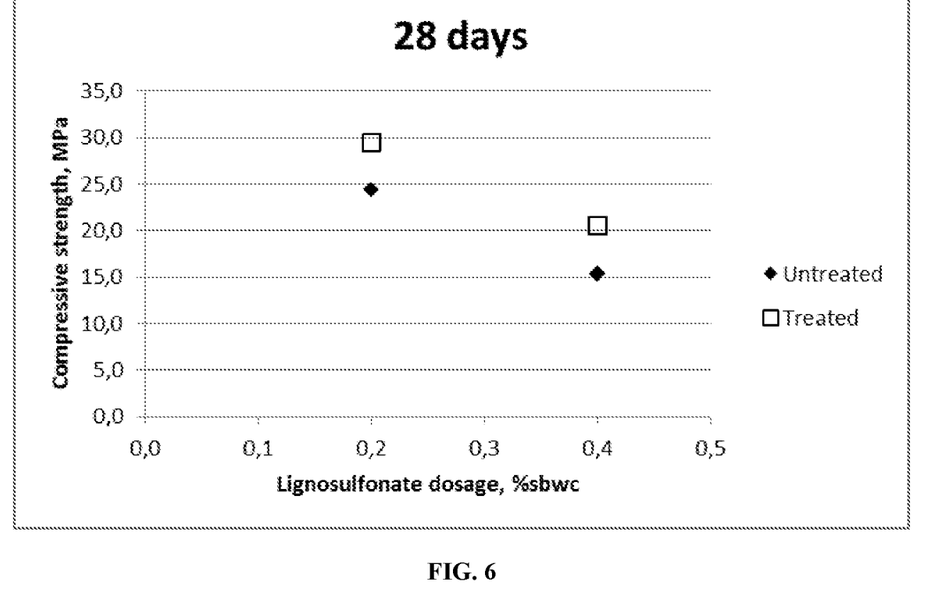
Figure 7:
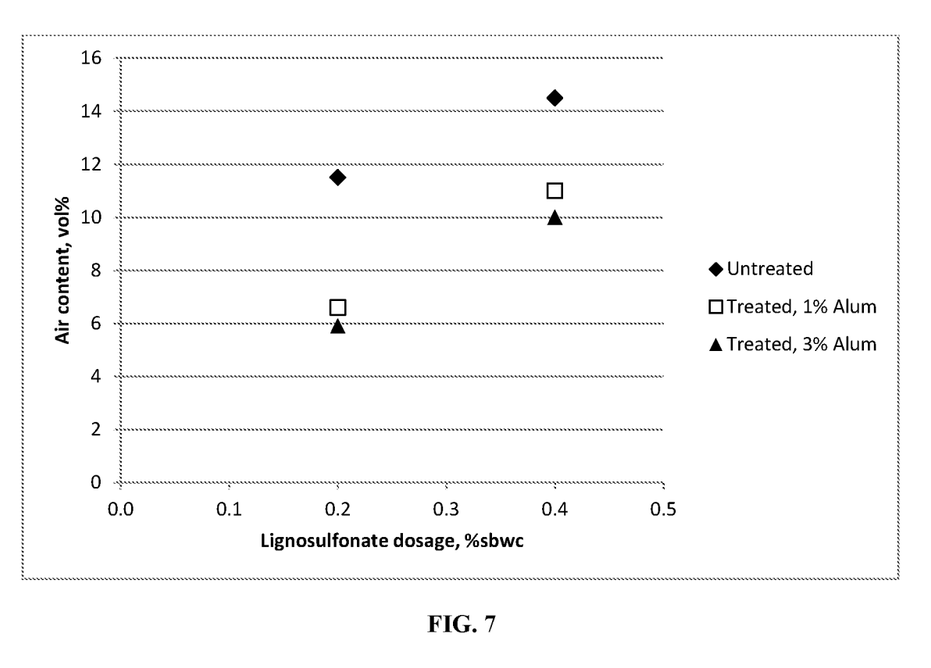
FIG. 7 summarizes the results of the air content measurement for the concrete with untreated ammonium lignosulfonate and the ion exchanged and sugar reduced samples treated with 1% and 3% Alum. The treated lignosulfonate samples show significantly reduced air entraining properties at all dosages compared to the untreated reference sample.
Figure 8:
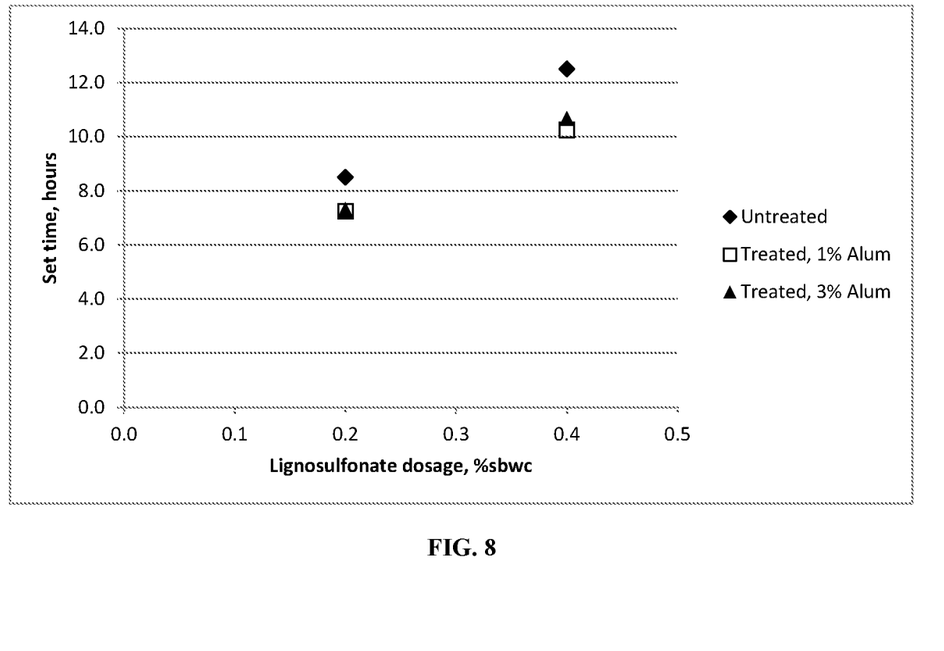
FIGS. 8-11 summarize set times and compressive strength data for the concrete with untreated ammonium lignosulfonate and the ion exchanged and sugar reduced samples treated with 1% and 3% Alum. Due to their lower sugar content, the treated lignosulfonate samples give lower set times at both dosages when compared to the untreated reference. This, combined with a lower air content, are also reflected in significantly higher compressive strength after 2, 7 and 28 days for both treated samples, at both lignosulfonate dosages.
Figure 9:
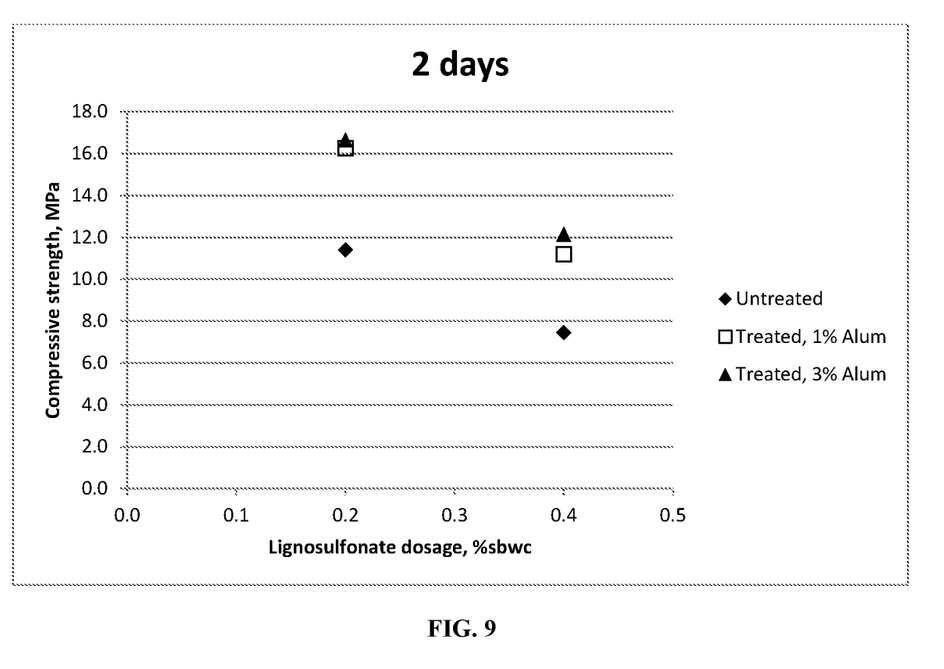
Figure 10:
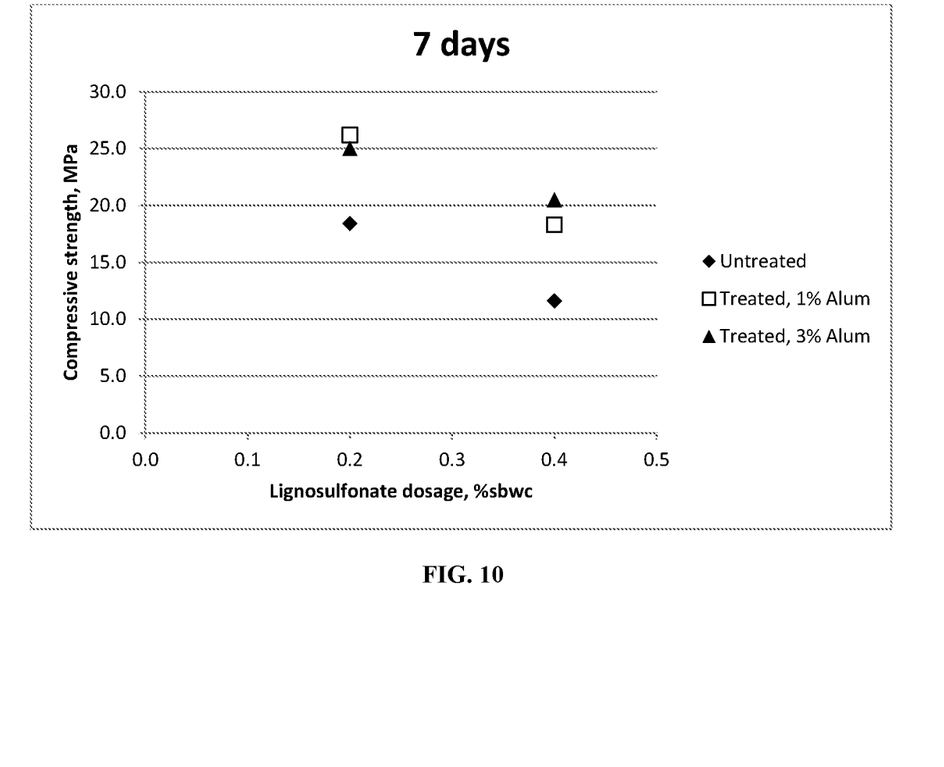
Figure 11:
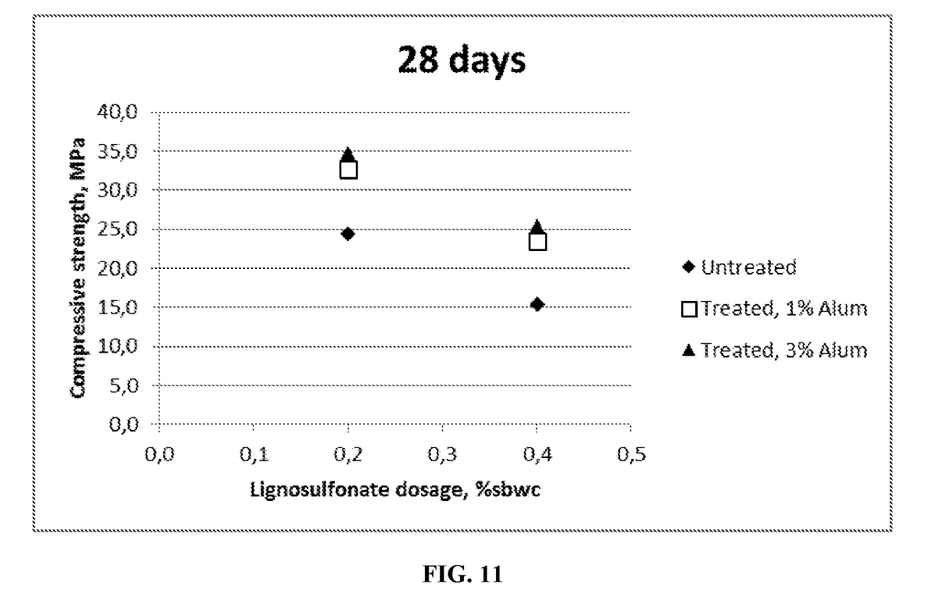

The untreated ammonium lignosulfonate reference and the samples subjected to the treatment were evaluated in concrete at 0.2% and 0.4% dosage (307 kg/m³ Holcim USA cement, w/c 0.7). FIG. 7 summarizes the results of the air content measurement for the concrete. Air entrainment was significantly reduced for the treated lignosulfonates at 0.2% and 0.4% dosages. There was, however, little difference in the effect of adding 1% and 3% Alum during the treatment. Set times and compressive strength data are summarized in FIGS. 8-11.

Again, the lower sugar content resulting from the treatment resulted in lower setting times, and the lower air resulted in higher compressive strengths, both at 2, 7 and 28 days. The improved effect was practically the same for 1% and 3% Alum during the treatment.

Equivalents

Unless otherwise defined, all technical and scientific terms used herein have the same meaning as commonly understood by one of ordinary skill in the art to which this technology belongs.

The present technology illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the present technology claimed.

Thus, it should be understood that the materials, methods, and examples provided here are representative of preferred aspects, are exemplary, and are not intended as limitations on the scope of the present technology.

The present technology has been described broadly and generically herein. Each of the narrower species and sub-generic groupings falling within the generic disclosure also form part of the present technology. This includes the generic description of the present technology with a proviso or negative limitation removing any subject matter from the genus, regardless of whether or not the excised material is specifically recited herein.

In addition, where features or aspects of the present technology are described in terms of Markush groups, those skilled in the art will recognize that the present technology is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

Other aspects are set forth within the following claims.

What is claimed is:

1. A method for preparing a storage stable lignosulfonate composition with reduced air entrainment and set retardation when used in concrete from a full sugar ammonium lignosulfonate composition, comprising
   a) mixing a crude ammonium lignosulfonate solution with an effective amount of a strong base and steam to remove ammonia;
   b) applying heat to the crude lignosulfonate composition prepared by step a) to reduce sugar levels to below 10%, wherein the crude lignosulfonate composition is heated to an internal temperature of about 101° C. or higher;
   c) mixing the lignosulfonate composition prepared by step b) with an effective amount of a source of trivalent ion to immobilize air entraining fatty acids and resin acids wherein the effective amount of trivalent ion comprises from about 0.005 to 0.6 mol/kg of crude lignosulfonate; and
   d) cooling the product of step b) or c) to prevent viscosity build-up.

2. The method of claim 1, wherein the source of the trivalent ion is selected from aluminum sulfate, aluminum nitrate, aluminum chloride, iron sulfate, and/or iron chloride.

3. The method of claim 1, wherein the trivalent ion is an iron or aluminum salt.

4. The method of claim 1, wherein the effective amount of trivalent ion comprises from about 0.01 to 0.4 mol/kg of crude lignosulfonate.

5. The method of claim 1, wherein the amount of heat comprises heating the solution to an internal temperature of from about 105° C. or higher.

6. The method of claim 1, wherein the amount of heat comprises heating the solution to an internal temperature of about 110° C. or higher.

7. The method of claim 1, wherein the amount of heat comprises heating the solution to an internal temperature of from greater than 101° C. to about 150° C. under pressure for about 0.1-3 hours at an initial pH of about 7 or above.

8. The method of claim 1, comprising adjusting the initial pH of the process to a pH of about 7 to about 14, optionally about 8 to about 13.

9. The method of claim 1, wherein the pH of the final product is below 6.0, and preferably below 5.0.

10. A storage stable lignosulfonate composition with reduced air entrainment and set retardation when used in concrete, obtainable by the method of claim 1.

* * * * *

UNITED STATES PATENT AND TRADEMARK OFFICE
CERTIFICATE OF CORRECTION

| | | |
|---|---|---|
| PATENT NO. | : 11,427,508 B2 | Page 1 of 1 |
| APPLICATION NO. | : 16/092741 | |
| DATED | : August 30, 2022 | |
| INVENTOR(S) | : Andresen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 843 days.

Signed and Sealed this
Fourth Day of February, 2025

Coke Morgan Stewart
*Acting Director of the United States Patent and Trademark Office*